US012181128B2

(12) United States Patent
Li

(10) Patent No.: US 12,181,128 B2
(45) **Date of Patent: *Dec. 31, 2024**

(54) ELECTRONIC CANDLE WITH DETACHABLE POWER SUPPLY

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,963

(22) Filed: Nov. 27, 2023

(65) Prior Publication Data

US 2024/0240765 A1 Jul. 18, 2024

Related U.S. Application Data

(63) Continuation of application No. 17/977,194, filed on Oct. 31, 2022, now Pat. No. 11,828,437, which is a continuation of application No. 17/496,213, filed on Oct. 7, 2021, now Pat. No. 11,486,555.

(30) Foreign Application Priority Data

Oct. 13, 2020 (CN) ........................ 202022264107.0

(51) Int. Cl.

| | |
|---|---|
| ***F21S 9/02*** | (2006.01) |
| ***F21L 4/08*** | (2006.01) |
| ***F21S 6/00*** | (2006.01) |
| ***F21S 10/04*** | (2006.01) |
| ***F21V 23/04*** | (2006.01) |

(52) U.S. Cl.

CPC ................ *F21S 9/02* (2013.01); *F21S 6/001* (2013.01); *F21S 10/04* (2013.01); *F21V 23/0435* (2013.01); *F21V 23/0464* (2013.01); *F21V 23/0485* (2013.01); *F21L 4/08* (2013.01)

(58) Field of Classification Search

CPC .................................. F21S 9/03; F21S 9/037

See application file for complete search history.

(56) References Cited

U.S. PATENT DOCUMENTS

| | | | |
|---|---|---|---|
| 4,107,763 | A | 8/1978 | Thiel et al. |
| 10,823,394 | B1 | 11/2020 | Hsu |
| 11,002,418 | B1 | 5/2021 | Hollinger |

(Continued)

*Primary Examiner* — Alexander K Garlen

(74) *Attorney, Agent, or Firm* — Perkins Coie LLP

(57) ABSTRACT

Methods, systems and devices associated with an electronic candle are disclosed. In one example aspect, an electronic candle includes a mounting frame that includes a first connector and a power supply assembly that is detachable from the mounting frame. The power supply assembly includes a second connector that forms a coupling mechanism with the first connector. The power supply assembly further includes an energy storage, a first power source configured to charge the energy storage, and an electrical connection interface configured to connect the power supply assembly to a second power source. The electronic candle also includes a light-emitting assembly that is removably coupled to the mounting frame configured to operate using power provided by the power supply assembly, and one or more controllers configured to control an operation of the light-emitting assembly.

14 Claims, 12 Drawing Sheets

(56) References Cited

U.S. PATENT DOCUMENTS

| | | | | |
|---|---|---|---|---|
| 11,047,539 | B1 * | 6/2021 | Halliwell ................ | F21S 9/037 |
| 2005/0254232 | A1 | 11/2005 | Bentley et al. | |
| 2007/0242451 | A1 | 10/2007 | Richmond | |
| 2008/0074867 | A1 | 3/2008 | Chen | |
| 2008/0218992 | A1 | 9/2008 | Li | |
| 2010/0254134 | A1 | 10/2010 | McCanless | |
| 2011/0205730 | A1 | 8/2011 | Richmond | |
| 2015/0055330 | A1 | 2/2015 | Xu | |
| 2019/0041051 | A1 | 2/2019 | Wijaya | |
| 2019/0203890 | A1 | 7/2019 | Moore et al. | |
| 2019/0338900 | A1 | 11/2019 | Benninghoff | |
| 2022/0112995 | A1 | 4/2022 | Li | |

* cited by examiner

ELECTRONIC CANDLE WITH DETACHABLE POWER SUPPLY

CROSS-REFERENCE TO RELATED APPLICATION(S)

This patent document is a continuation of U.S. patent application Ser. No. 17/977,194, filed Oct. 31, 2022, which is a continuation of U.S. patent application Ser. No. 17/496,213, filed Oct. 7, 2021, now U.S. Pat. No. 11,486,555, which further claims priority to Chinese Patent Application No. 202022264107.0, filed on Oct. 13, 2020. The entire content of the before mentioned patent applications is incorporated by reference in this patent document.

TECHNICAL FIELD

The present disclosure relates to electronic lighting technology, and more particularly, to an electronic candle device.

BACKGROUND

In home facilities, public restaurants, churches, temples, large theme parks or urban public infrastructures, candles are used to provide lighting and to create ceremonial or romantic atmospheres. However, a conventional candle has a short lifetime and needs to be replaced frequently. Moreover, a potential risk of fire due to the fire flame prevents candles from being widely used.

SUMMARY

The present disclosure relates to an electronic candle that comprises a detachable power supply to facilitate convenient removal and/or replacement of the power source.

In one example aspect, an electronic candle includes a mounting frame that includes a first connector and a power supply assembly that is detachable from the mounting frame. The power supply assembly includes a second connector that forms a coupling mechanism with the first connector. The power supply assembly further includes an energy storage, a first power source configured to charge the energy storage, and an electrical connection interface configured to connect the power supply assembly to a second power source. The electronic candle also includes a light-emitting assembly that is removably coupled to the mounting frame configured to operate using power provided by the power supply assembly, and one or more controllers configured to control an operation of the light-emitting assembly.

These, and other, aspects are described in the present document.

DETAILED DESCRIPTION

In order to facilitate the understanding of the features and advantages of the disclosed technology, the present disclosure will be explained with reference to the example figures and embodiments. It is to be noted here that the embodiments and features can be combined with each other, provided that they do not conflict. Thus, the scope of the present disclosure is not limited to the embodiments disclosed below.

Electronic candles can also be called electronic light-emitting diode (LED) candles that include flame pieces simulating the shape of real flames, making electronic candles not only practical and safe for lighting, but also ornamental and decorative. The electronic candle includes a power supply power section. However, the disassembly and assembly of the power supply section can be cumbersome due to the arrangement of the power supply in the electronic candle device. This patent document discloses techniques that can be implemented an electronic candle to improve the disassembly and assembly of the power supply in addition to providing other features and benefits.

Figure 1:
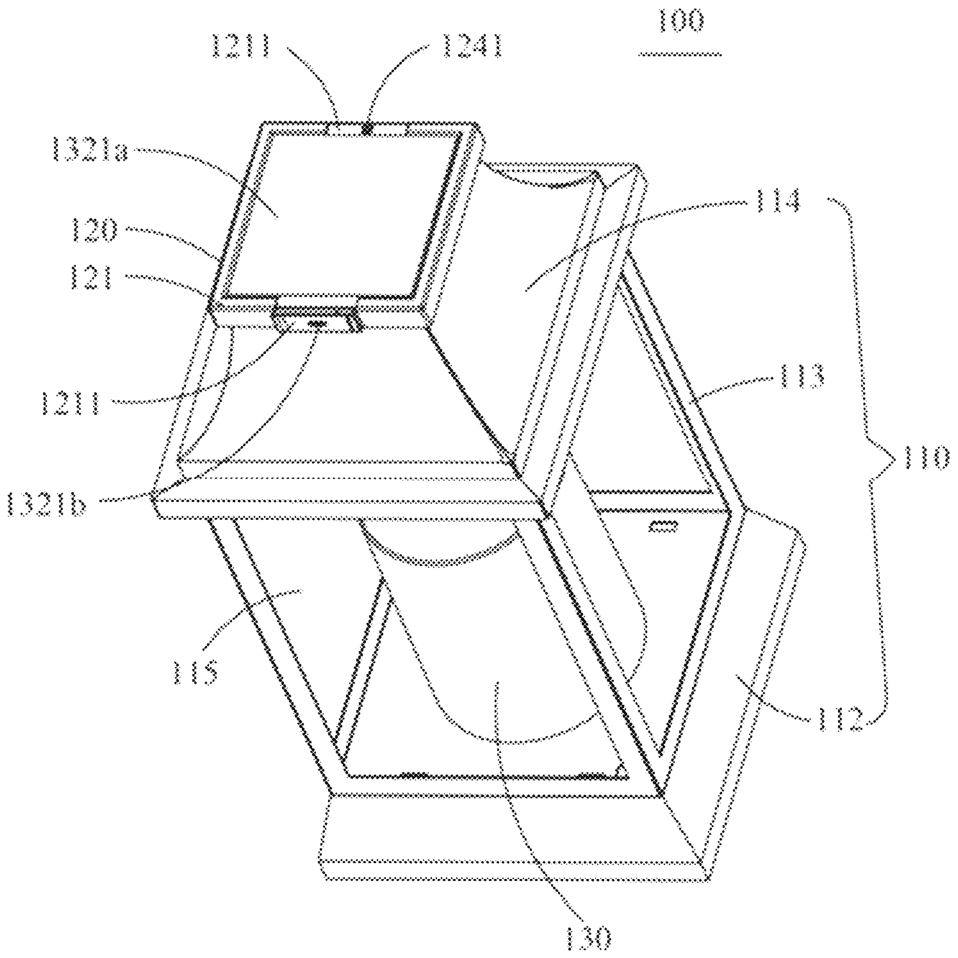
FIG. 1 illustrates a schematic diagram of an example electronic candle device in accordance with one or more embodiments of the present technology.
Figure 2:
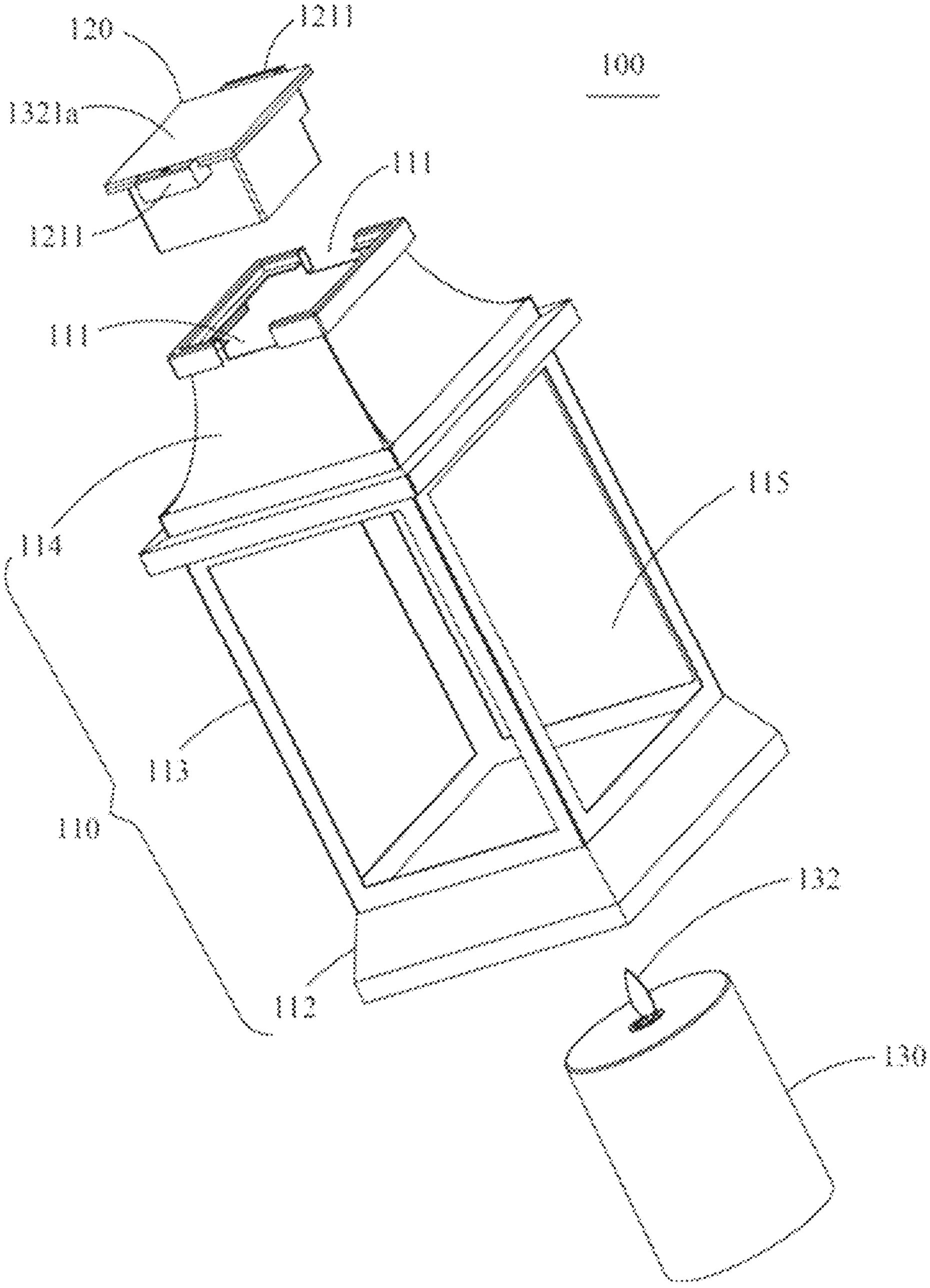
FIG. 2 illustrates a blow-up diagram of components of an example electronic candle device in accordance with one or more embodiments of the present technology.

FIGS. 1-2 illustrate an example electronic candle device 100 in accordance with one or more embodiments of the present technology. As shown in FIG. 1, the electronic candle 100 includes a mounting frame 110, a power supply assembly 120 that is detachable from the mounting frame 110, and a light-emitting assembly 130 that is removably coupled to the mounting frame 110.

FIG. 2 illustrates that the mounting frame 110 includes a first connecting portion 111. The housing 121 also includes a second connecting portion 1211 that can be coupled to the first connecting portion 111. The second connection portion 1211 and the first connecting portion 111 can be coupled together using a coupling mechanism (e.g., in a snap-fitting manner) to achieve a detachable connection between the power supply assembly 120 and the mounting frame 110. The light-emitting assembly 130 includes a light-emitting body and a flame sheet 132. Details about the light-emitting assembly 130 are further discussed below in connection with FIG. 5.

Referring back to FIG. 1, in some embodiments, the power supply assembly 120 is configured to include a housing 121 and a power storage positioned in the housing 121. The housing 121 and the mounting frame 110 are connected through the second connecting portion 1211 and the first connecting portion 111. The power supply component 120 can be disposed inside or outside of the mounting frame 110 so long as the power supply component 120 is easily accessible to the user. For example, the power supply assembly 120 can be disposed on the inner top surface, the inner side surface, the inner bottom surface, the outer top surface, the outer side surface, or the outer bottom surface of the mounting frame 110. The first and second connection portions allow convenient assembly or disassembly of the entire power supply assembly 120 for replacement purposes without the need to move or tilt the electronic candle device. In some embodiments, the entire disassembled power supply assembly 120 can be disassembled when the battery needs to be replaced or charged.

In order to achieve the detachable connection between the first connecting portion 111 and the second connecting portion 1211, the first connecting portion 111 and the second connecting portion 1211 can be implemented as a pair of snap connectors (e.g., with a protrusion and a slot). For example, the first connecting portion 111 can be implemented as a slot, and the second connecting portion 1211 can be implemented as a protrusion that can be coupled to the slot. The housing 121 can include one or more of the first connection parts 111. In order to ensure a smooth connection between the mounting frame 110 and the power supply assembly 120, the number of the second connecting portions 1211 is equal to the number of the first connecting portions 111, and each second connecting portion 1211 is correspondingly connected to one first connecting portion 111 in a snap-fit manner. In some embodiments, the first connecting portion 111 and/or the second connecting portion 1211 can be arranged symmetrically on the mounting seat 114.

In some embodiments, the mounting frame 110 can have various types of shapes and/or structures. For example, the mounting frame 110 can have a closed structure or an open structure. In some embodiments, referring to FIGS. 1 and 2, the mounting frame 110 includes a base 112, a number of upright pillars 113 and a mounting top 114. The upright pillars 113 are positioned at the same side of the base 112. The mounting base 114 is connected to one end of the upright pillars 113 away from the base 112, so that the mounting base 114, the upright pillars 113, and the base 112 jointly form a cavity 115 for the installation of the light-emitting assembly 130. In some embodiments, the upright pillars 113 can form an open structure of the mounting frame 110. In some embodiments, there can be one or more surfaces between the upright pillars 113 to form a closed structure of the mounting frame 110. The surfaces can includes a light-transmitting material (e.g., transparent or translucent materials) to allow the light from the light-emitting assembly 130 to pass through the mounting frame 110.

The first connecting portion 111 can be positioned on the side of the mounting seat 114 away from the base 112 so that users can view the light-emitting assembly 130 through the gap(s) between the upright pillars.

Figure 3:
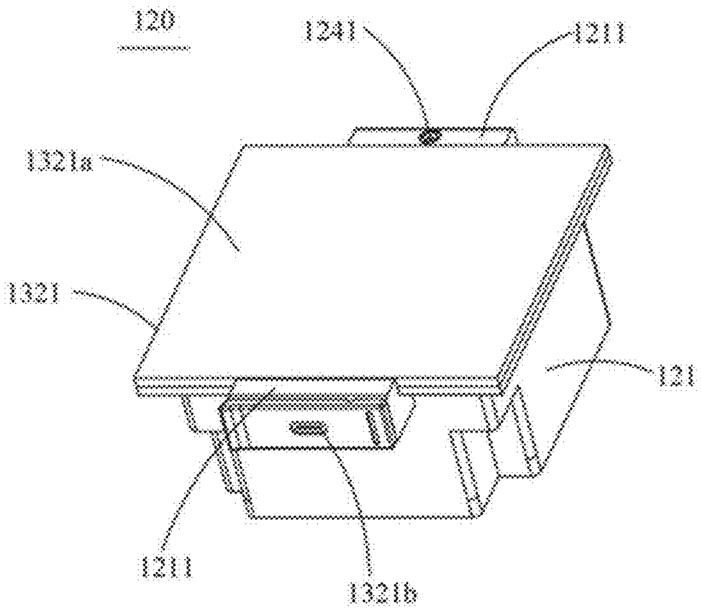
FIG. 3 illustrates a schematic diagram of an example power supply component in an electronic candle in accordance with one or more embodiments of the present technology.
Figure 4:
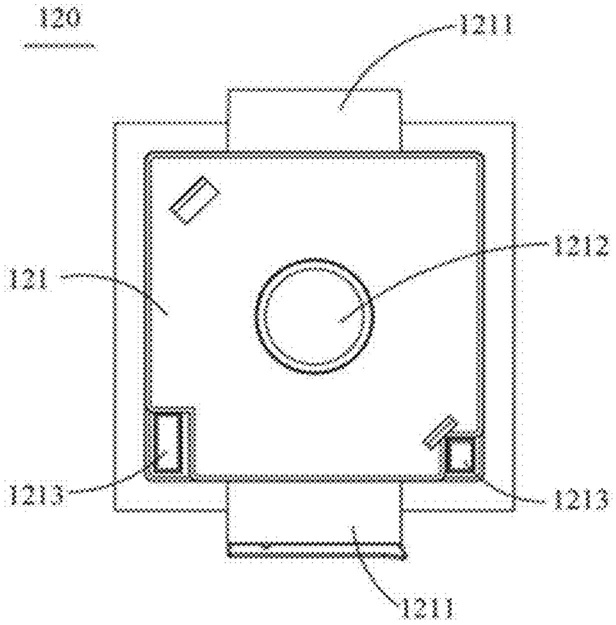
FIG. 4 illustrates a bottom view of an example power supply component in an electronic candle in accordance with one or more embodiments of the present technology.
Figure 15:
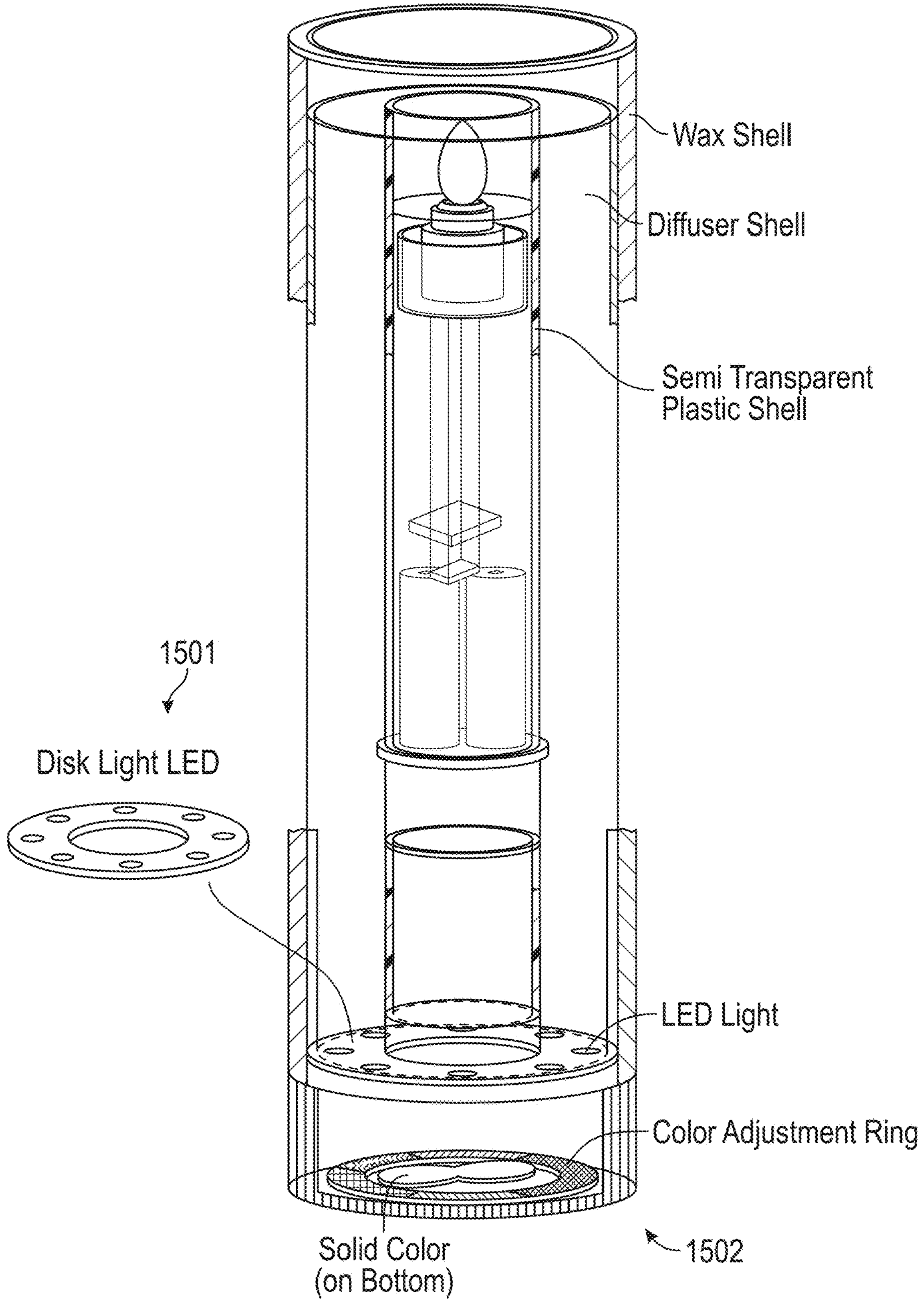
FIG. 15 illustrates an example electronic candle with extra light sources that provide color varying light in accordance with one or more embodiments of the present technology.

FIGS. 3-4 illustrate an example power supply component in an electronic candle in accordance with one or more embodiments of the present technology. As shown in FIG. 4, one side of the housing 121 that faces the mounting frame 110 can include a mounting hole 1212. The mounting hole 1212 can be used to hold additional components (e.g., extra LED lights and other parts). For example, the light from the extra LED lights installed in the mounting hole 1212 can blend with the light emitted by the light-emitting assembly 130. The light can have different colors that vary over time. Alternatively, or in addition, extra LED lights can be provided at the bottom of the light-emitting assembly. For example, as shown in FIG. 15, LED lights can form a disk 1501 and be positioned at a bottom surface within an outer shell of the light-emitting assembly. The LED lights can emit different same or different colors that can be blended with the light emitted by the light source that is close to the flame element. In some embodiments, an additional color adjustment ring 1502 is provided underneath the additional LED lights to enable different light colors. The extra LED lights can be controlled to emit varying colors of light that change over time to create a more aesthetic appearance of the electronic device.

Referring back to FIGS. 3-4, in some embodiments, the housing 121 can include a translucent material that allows at least part of the light to pass through. The light emitted by the light-emitting assembly 130 can enter into the housing 121 via the mounting hole 1212, thereby achieving a more aesthetic appearance.

In some embodiments, as shown in FIG. 4, one side of the housing 121 that faces the mounting frame 110 can be provided with a notch 1213. The notch 1213 can include an electrical connection interface electrically connected to the battery 122. The connection between the battery 122 and the light-emitting assembly 130 can be established using a connection wire connected to the electrical connection interface. When the power supply component 120 is positioned at the top of the mounting frame 110, the notch 1213 is located at the bottom of the housing 121 of the power supply component 120. By arranging the notch 1213 to be located at the bottom of the housing 121, it is possible to prevent rainwater from entering the component(s) and causing electric leakage or other damages. In some embodiments, the depth of the notch 1213 can be deeper so as to allow the electrical connection interface to be far away from the open end of the notch 1213, thereby preventing the interface from being exposed and enhancing the safety of the electrical connection.

In some embodiments, multiple notches 1213 are provided. For example, two notches 1213 are provided for the electrical connection interfaces (e.g., a 2-pin port or a 4-pin port). The two notches 1213 can be provided on opposite sides of the housing 121. A protective cover (e.g., a silicone cover with waterproof level 4) can be positioned on top of the notch to provide protection of the notch.

Figure 5:
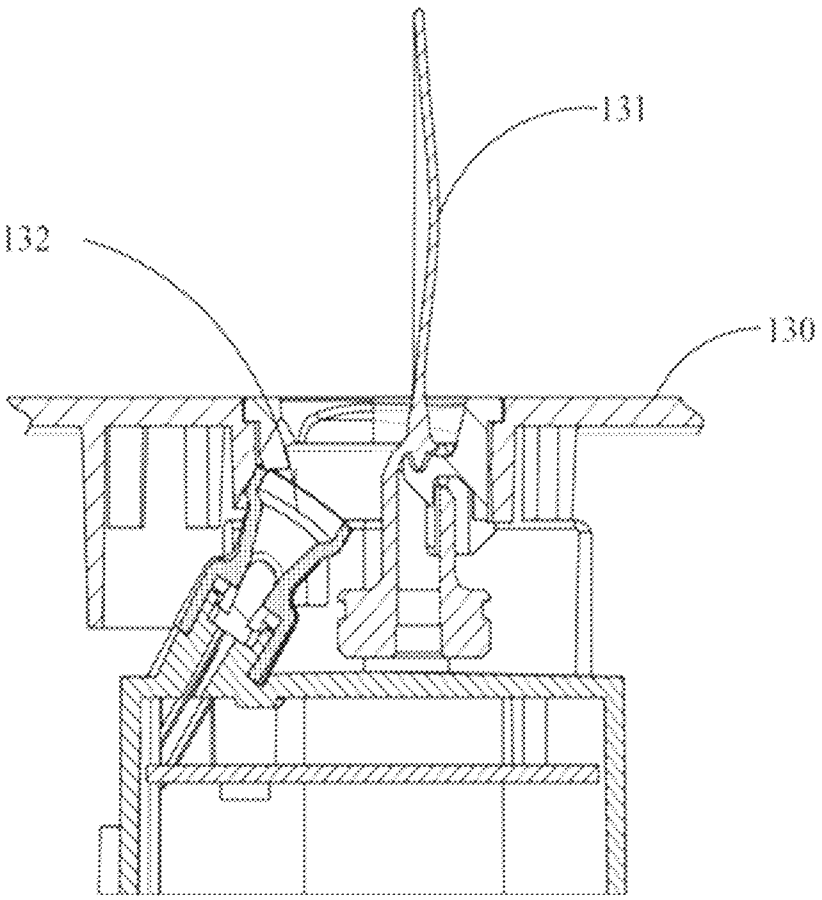
FIG. 5 illustrates a cross-sectional view of an example light-emitting component of an electronic candle in accordance with one or more embodiments of the present technology.

FIG. 5 illustrates a cross-sectional view of an example light-emitting component in an electronic candle in accordance with one or more embodiments of the present technology. The light-emitting assembly 130 includes a through-hole positioned on a top surface to allow a flame element or a flame sheet 131 protruding from a through hole. The flame element or flame sheet has a shape that resembles a real flame. In some embodiments, the flame piece 131 is arranged on a base and is flexibly movable relative to the base. A light source 132 is arranged on the base, and the light emitted by the light source 132 can be cast on the flame sheet or the flame element 131 to create an appearance of a real flame.

In some embodiments, the light source 132 includes at least one LED light. The color of the LED light can be selected according to requirements. In order to better simulate the candle lighting scenarios, the color of the LED light is preferably close to the color of the fire. Alternatively, or in addition, the color of the LED light can also be a variable color to be able to meet the needs of different users. The light source 132 can include multiple LED lights that can operate simultaneously or in series. The brightness of each LED light can be the same or different. For example, the LED lights can be turned on in a flashing manner to simulate the flashing effect of the fire. In some embodiments, to enable the flame piece 131 to better simulate the shape of a real candle, the light-emitting assembly 130 can include a magnet and a coil. The magnet can be arranged at the bottom of the flame piece 131 to drive the movement of the flame piece 131.

In some embodiments, the light-emitting assembly 130 and the mounting frame 110 are adjustably coupled. For example, the angle between the light-emitting assembly 130 and the mounting frame 110 can be manually or remotely adjusted to achieve a desired lighting effect.

Figure 13:
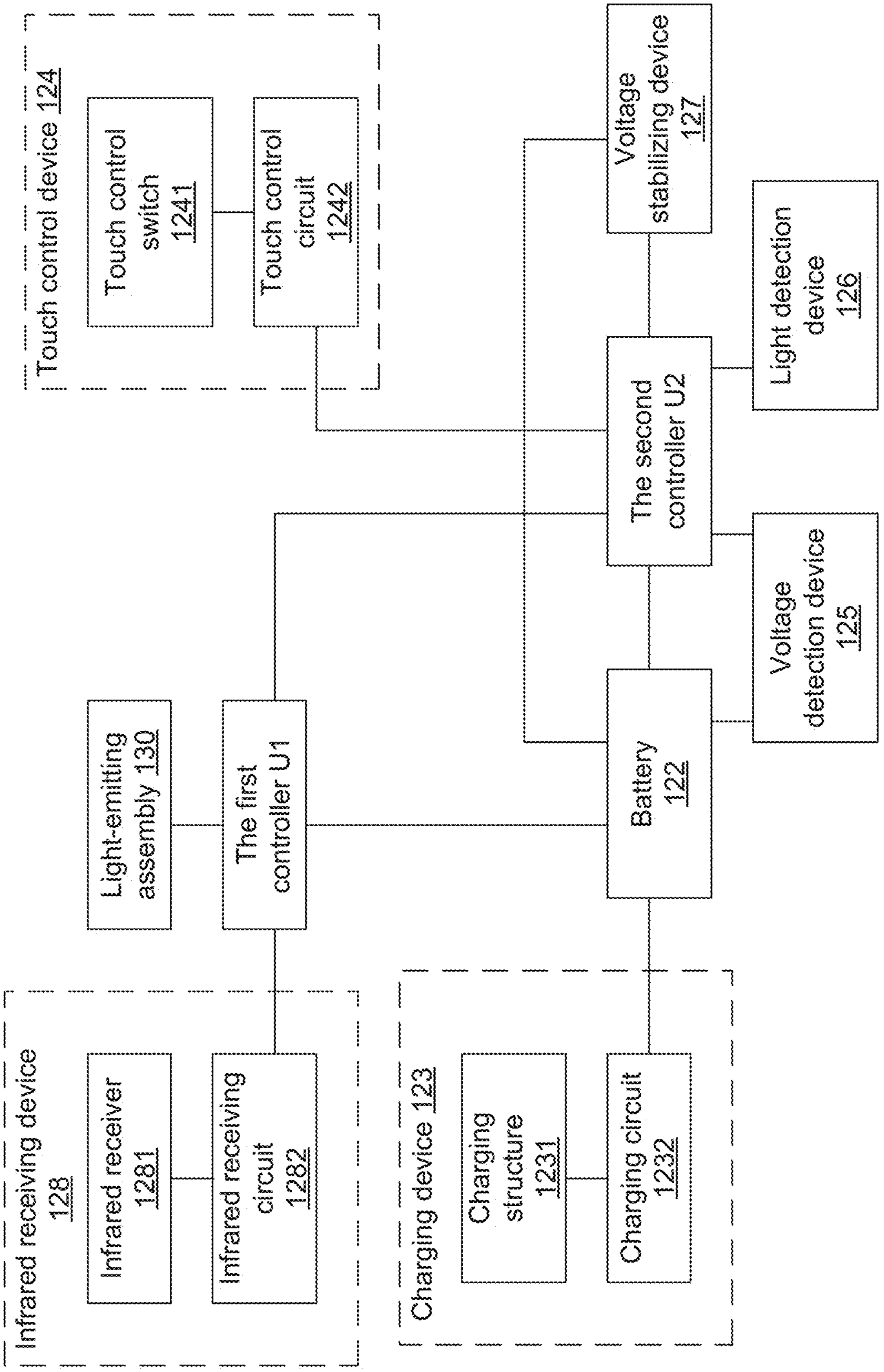
FIG. 13 illustrates a block diagram of example components of an electronic candle in accordance with one or more embodiments of the present technology.

FIG. 13 illustrates a block diagram of example components of an electronic candle in accordance with one or more embodiments of the present technology. To avoid frequent battery replacement, the power supply assembly 120 can further include a charging device 123 electrically connected to the storage battery 122. The charging device 123 can include a charging structure 1231 and a charging circuit 1232. The charging circuit 1232 is electrically connected to the charging structure 1231 and the storage battery 122. In some embodiments, referring back to FIGS. 1 to 3, the charging structure 1231 includes a solar panel 1321*a*. The solar panel 1321*a* can be electrically connected to the charging circuit to convert solar energy into electricity. In some embodiments, the charging structure includes an electrical connector that is electrically connected to the charging circuit. The electrical connector is used to electrically connect to an external power source, thereby enabling supplying power to the storage battery 122. More specifically, as shown in FIGS. 1-3, the electrical connector can be an electrical connection interface 1321*b*, such as a Universal Serial Bus (USB) Type-C interface, a Lightning interface, a USB2.0 interface, or a USB3.0 interface. Furthermore, the electrical connector can be positioned on the second connecting portion 1211 to form the protrusion of the snap connectors. In some embodiments, the power supply assembly 120 is located on the top of the mounting frame 110, and the electrical connector can be installed on the surface facing away from the mounting frame 110 and/or the housing 121 so that the user can connect the external power supply with the electrical connector. In some embodiments, the power supply component 120 can be powered by solar energy, heat energy, wind energy, and other types of energy suitable for the use scenarios of the electronic candle 100.

In some embodiments, referring back to FIG. 13, the light-emitting assembly can include a first controller U1. The first controller U1 can be electrically connected to the battery 122 and the light-emitting assembly 130 to control the operation of the light-emitting assembly 130 (e.g., brightness or color control). In some embodiments, the power supply component can include a second controller U2. The second controller U2 can be electrically connected to the battery 122 and be communicatively connected to the first controller U1 for information exchange.

Figure 6:
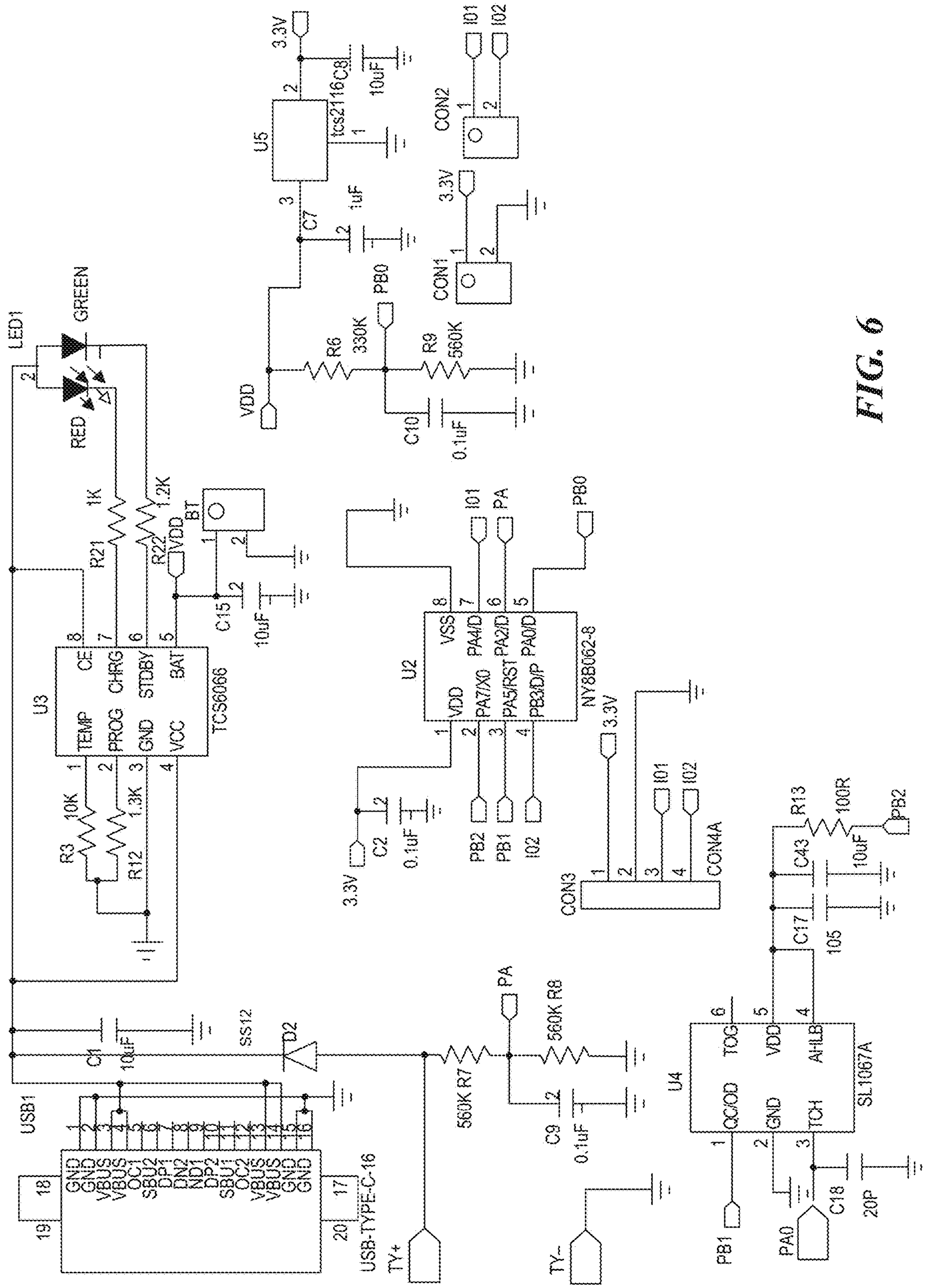
FIG. 6 illustrates a circuit diagram of example power supply components of an electronic candle in accordance with one or more embodiments of the present technology.
Figure 7:
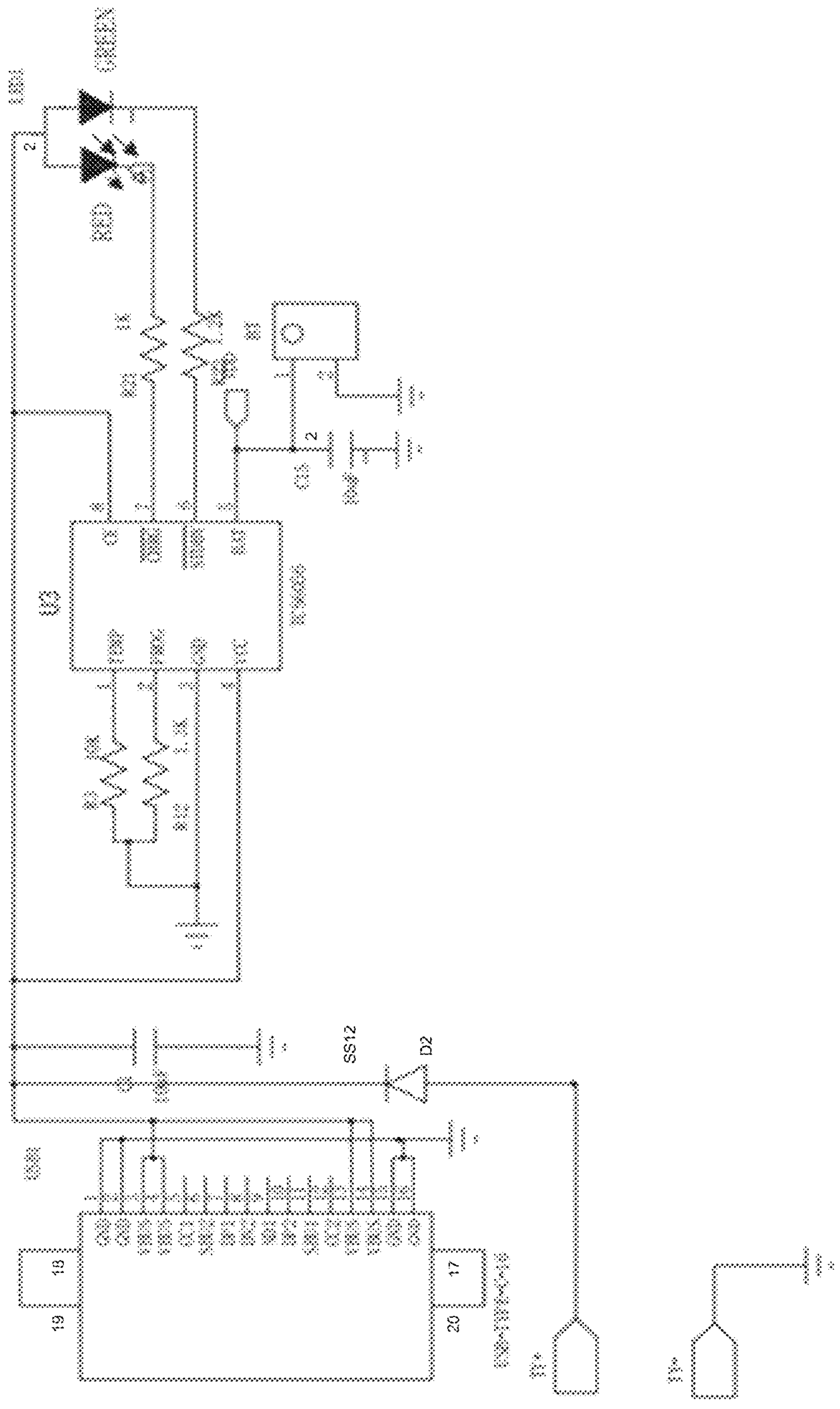
FIG. 7 illustrates a circuit diagram of an example charging device in the power supply components of an electronic candle in accordance with one or more embodiments of the present technology.

FIGS. 6-7 illustrates example power supply components and an example charging circuit of an electronic candle in accordance with one or more embodiments of the present technology. FIG. 6 illustrates an example first controller U1 and an example second controller U2. FIG. 7 illustrates that, in some embodiments, the charging circuit can include a third controller U3 (e.g., model TCS6056). The third controller U3 includes multiple pins that can be used as signal input terminals. For example, the 4th and 8th pins of the third controller U3 are used as signal input terminals. The signal input terminal of the third controller U3 can be grounded through the capacitor C1. The first pin of the third controller U3 can be grounded via resistor R3, the second pin of the third controller U3 can be grounded via resistor R12, and the 3rd-5th pins of U3 can be directly grounded. Selected pins can be connected to the battery 122. In some embodiments, C1 and C15 can be filter capacitors, R3 can be a temperature control resistor, R12 can be a charging current adjustment resistor, and the maximum charging current can be 1 amp.

The charging circuit can also include one or more indicator LEDs (e.g., two LEDs). The indicator LEDs can be connected to the pins of the third controller U3 (e.g., 6th and 8th pins) through the resistor R21 and the resistor R22 respectively. One indicator LED can be used to light up when charging (e.g., showing a red color), and the other indicator LED can be used to light up when the battery is fully charged (e.g., showing a green color).

In some embodiments, when the charging structure includes the solar panel, the anodes of the solar panel can be connected to the signal input terminal of the third controller U3 through the isolation diode D2. In some embodiments, the charging current is about 150 mA. When the charging structure 1231 includes an electrical connector, the external power source can be a 5V Direct Current (DC) power source. When there is no solar power available, the external power supply can be supplied to the storage battery 122 through the electrical connector to ensure the normal operation of the electronic candle.

Figure 8:
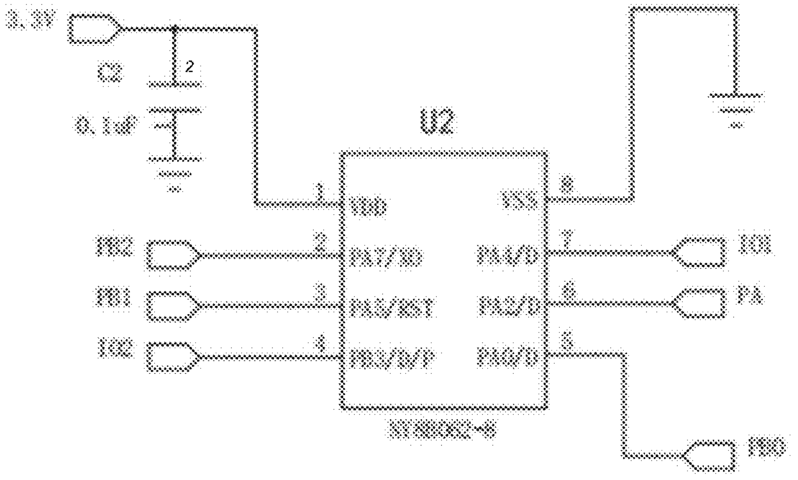
FIG. 8 illustrates a circuit diagram of an example second controller of an electronic candle in accordance with one or more embodiments of the present technology.
Figure 12:
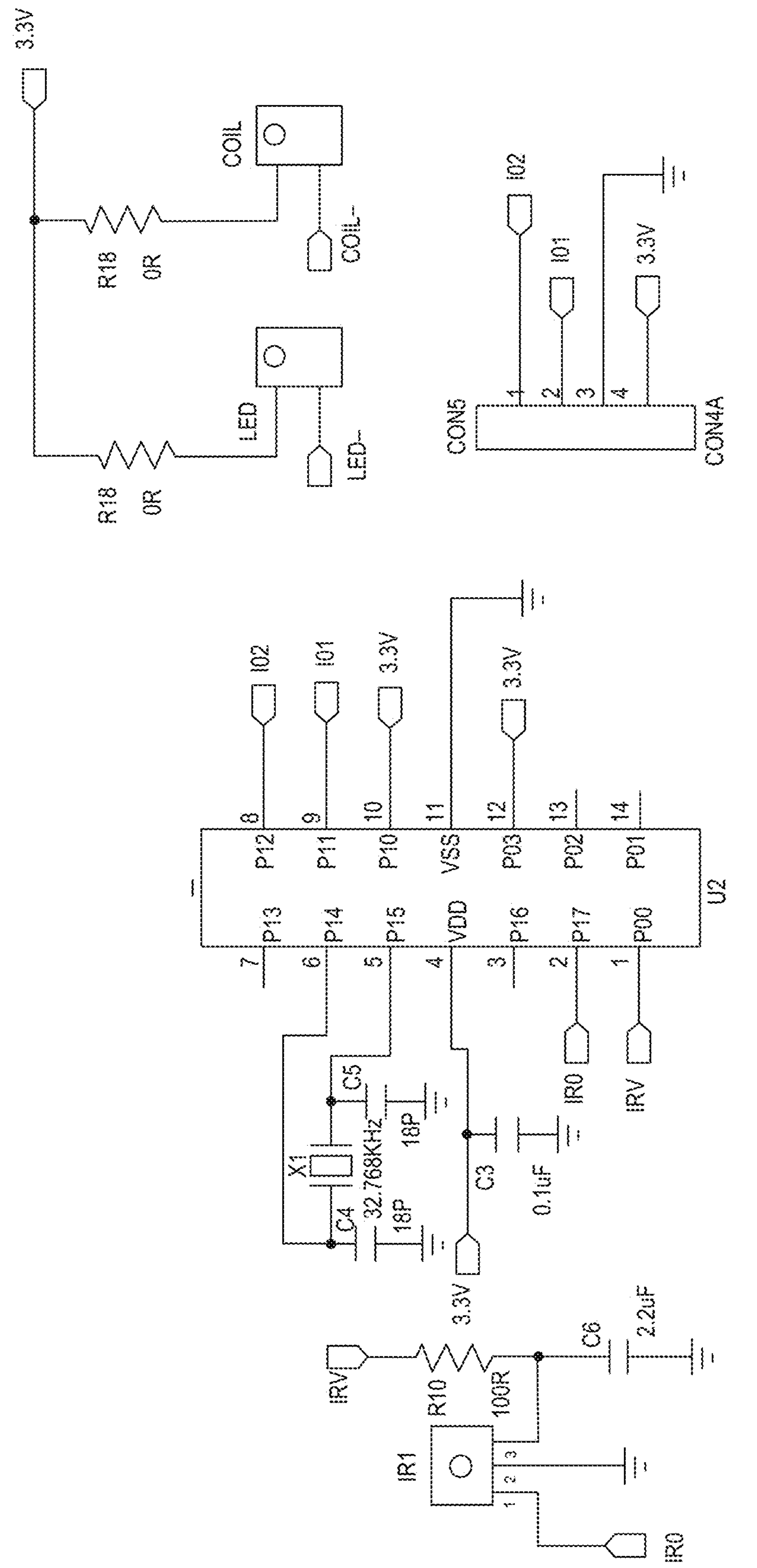
FIG. 12 illustrates a circuit diagram of an example light-emitting assembly of an electronic candle in accordance with one or more embodiments of the present technology.

FIG. 8 illustrates a circuit diagram of an example second controller of an electronic candle in accordance with one or more embodiments of the present technology. The second controller U2 can be model NY8B062-8. The first pin of the second controller U2 can be connected to the battery 122 and be grounded via the capacitor C2. The 4th and 7th pins of the second controller U2 can be respectively connected to the 10th and 12th pins of the first controller U1 to be able to communicate with each other. FIG. 12 illustrates a circuit diagram of an example light-emitting assembly of an electronic candle in accordance with one or more embodiments of the present technology. The two ends of the light-emitting assembly can be respectively connected to the No. 8 pin of the first controller U1 and to the storage battery 122 via the resistor R18. In some embodiments, two ends of a coil and/or magnet are respectively connected to the first controller. The No. 9 pin of U1 and the resistor R19 are connected to the battery 122. When the coil is energized, the magnetic field generated by the coil and the magnetic field generated by the magnet can be coupled, thereby driving the movement of the flame piece by controlling the magnitude and direction of the energized current.

In some embodiments, referring to FIG. 13, the power supply component 120 can further include a touch device 124 electrically connected to the second controller U2. As shown in FIGS. 1, 3 and 13, the touch device 124 can include a touch sensor 1241 and a touch circuit 1242. The touch sensor 1241 is used to detect touch operations. The touch circuit 1242 is electrically connected to the touch sensor 1241 and the second controller U2. The user can control the brightness, darkness, and/or timing of the light-emitting assembly by controlling the touch sensor 1241. For example, touching the touch sensor 1241 can turn on/off the light-emitting assembly 130. The user can also long press the touch sensor 1241 to enter the sensor mode or timing mode, it can be turned off after 8 hours; then wait for the next cycle.

In some embodiments, the touch sensor 1241 can be installed on the second connecting portion 1211. For example, as shown in FIG. 3, when the power supply component 120 is located on the top of the mounting frame 110, the touch sensor 1241 can be installed on the surface of second connecting portion 1211 away from the mounting frame 110, thereby allowing convenient access to the user to touch the touch sensor 1241. The touch sensor 1241 can also be installed on other parts of the electronic candle devices to allow easy access of the touch control to the user.

Figure 9:
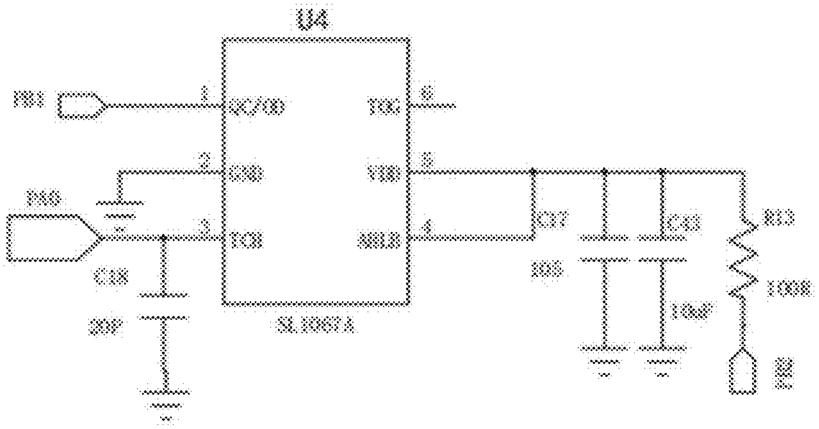
FIG. 9 illustrates a circuit diagram of an example touch control device of an electronic candle in accordance with one or more embodiments of the present technology.

FIG. 9 illustrates a circuit diagram of an example touch control device of an electronic candle in accordance with one or more embodiments of the present technology. As shown in FIG. 9, the touch circuit can include a fourth controller U4 (e.g., model SL1067A). The 1st pin of the fourth controller U4 can be connected to the second controller U2, the third pin of the fourth controller U4 can be connected to the ground, the third pin of the fourth controller U4 can be connected to the touch sensor 1241, and the third pin of the fourth controller U4 can also be connected. The 4th pin and the 5th pin of the fourth controller U4 can be grounded through the capacitors C17, C18, or C43, and connected to the No. 2 pin of the second controller U2 through the resistor R13.

In some embodiments, as shown in FIG. 13, the power supply component 120 further includes a voltage detection device 125. The voltage detection device 125 can be electrically connected to the second controller U2 and the battery 122 to transmit detected voltage information to the first controller U1 via the second controller U2. The first controller U1, upon receiving the voltage information, can control the brightness of the light-emitting assembly 130 accordingly to prevent the battery 122 from being damaged by lighting the light-emitting body 131 when the battery 122 has a low power. Specifically, when the power of the storage battery 122 is less than 3.4V, the first controller U1 can control the light-emitting body 131 to turn off, so that the product is in a sleep state, the power consumption is small, and the lithium battery will not be damaged.

Figure 10:
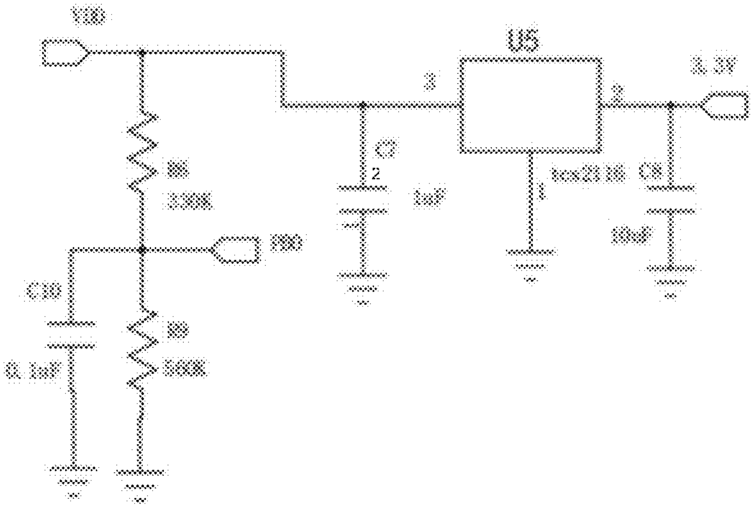
FIG. 10 illustrates a circuit diagram of an example voltage detection device of an electronic candle in accordance with one or more embodiments of the present technology.

As shown in FIG. 8 and FIG. 10, the voltage detection device 125 may include a resistor R6, a resistor R9, and a capacitor C10. One end of the resistor R6 may be connected to the battery 122, and the other end of the resistor R6 may be grounded through the capacitor C10 and grounded through the resistor R9. And connected with the No. 5 pin of the second controller U2 to form a voltage detection circuit.

In some embodiments, the power supply component 120 may further include a voltage stabilizing device 127. The voltage stabilizing device 127 is electrically connected to the second controller U2 and the battery 122. The voltage stabilizing device 127 can stabilize the output voltage of the battery 122 at a certain value. For example, the output voltage of the battery 122 can be stabilized at 3.3 v.

As shown in FIG. 8 and FIG. 10, the voltage stabilizing device 127 (e.g., model tcs2116) can include a fifth controller U5, a capacitor C7, and a capacitor C8. The No. 3 pin of the fifth controller U5 may be Connected to the battery 122, the third pin of the fifth controller U5 can also be grounded through the capacitor C7, and the 2nd pin of the fifth controller U5 can be grounded through the capacitor C8, thereby forming a voltage stabilizing circuit.

In some embodiments, the power supply assembly 120 may further include a light detection device 126 configured to detect an intensity of an ambient. The light detection device 126 is electrically connected to the second controller U2, and the second controller U2 is used to transmit the light detection information of the light detection device 126 to the first controller U1. When the light reaches a certain intensity (e.g., when the surrounding gets bright), the first controller U1 can control the light-emitting assembly 130 to extinguish. When the intensity of the ambient light reaches a certain intensity, the first controller U1 can control the light-emitting assembly 130 to turn on.

Figure 11:
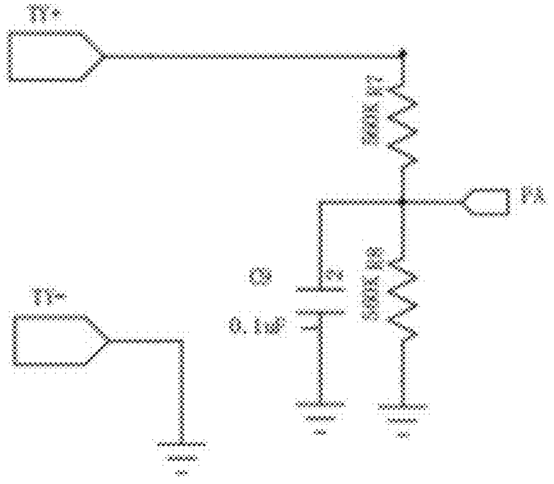
FIG. 11 illustrates a circuit diagram of an example light detection device of an electronic candle in accordance with one or more embodiments of the present technology.

As shown in FIG. 8 and FIG. 11, the light detection device 126 can include a resistor R7, a resistor R8, and a capacitor C9. One end of the resistor R7 can be connected to the positive electrode of the solar panel 1321*a*, and the other end of the resistor R7 can be grounded through the capacitor C9.

In some of the embodiments, the light-emitting assembly 130 further includes an infrared receiving device 128 electrically connected to the first controller U1. The infrared receiving device 128 can include an infrared receiver 1281 and an infrared receiving circuit 1282. The infrared receiver 1281 is used to receive infrared signals. The infrared receiving circuit 1282 is electrically connected to the infrared receiver 1281 and the first controller U1. The infrared receiver 1281 can receive infrared signals to enable remote control of the candle device.

As shown in FIG. 12, the infrared receiving circuit 1282 can include a resistor R10 and a capacitor C6. The 1st pin of the infrared receiver 1281 can be connected to the second pin of the first controller U1. The third pin of the infrared receiver 1281 can be grounded via the capacitor C6 or be connected to the first pin of the first controller U1 via a resistor R10.

Figure 14:
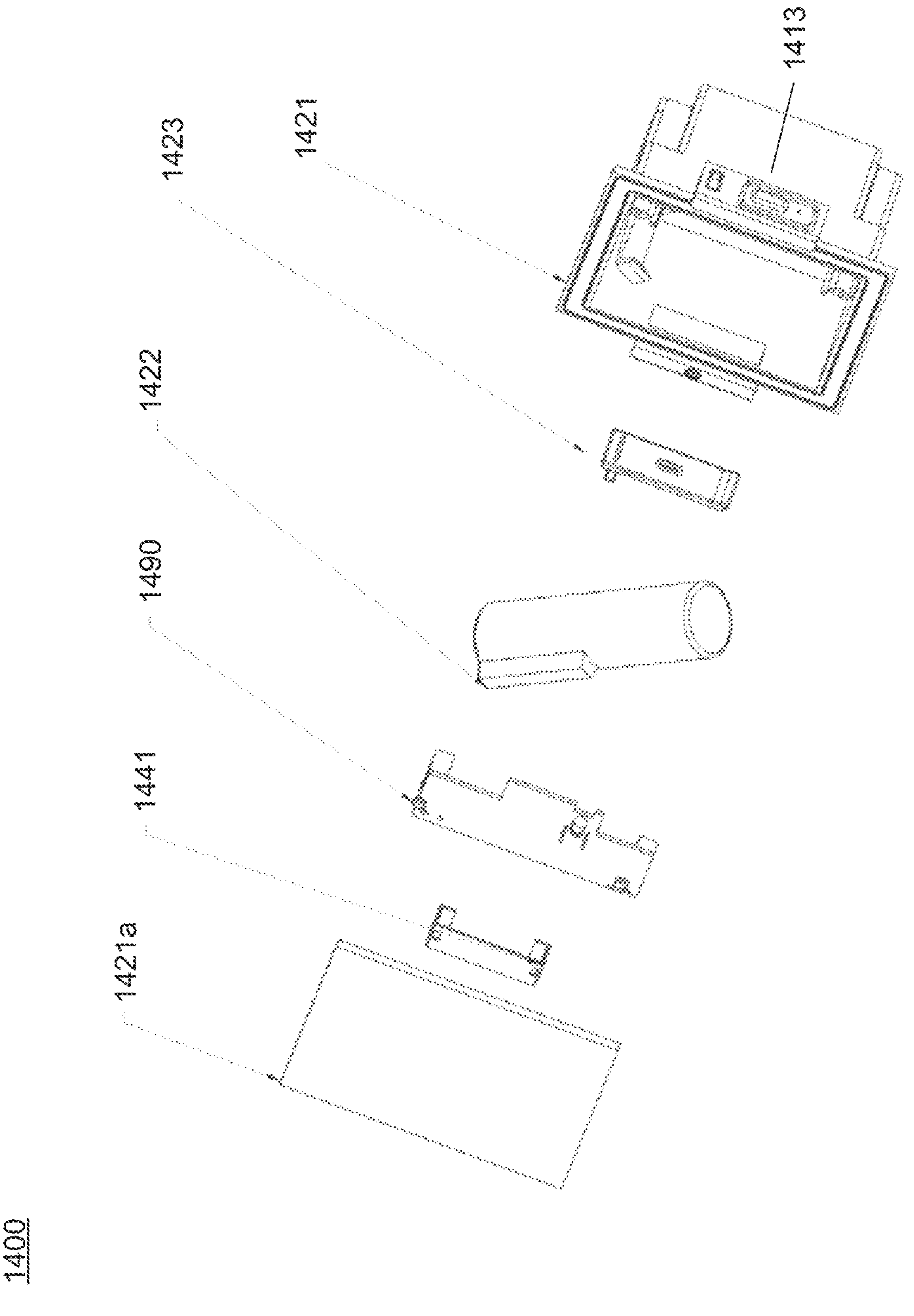
FIG. 14 illustrates a blow-up diagram of an example power supply component in an electronic candle in accordance with one or more embodiments of the present technology.

FIG. 14 illustrates a blow-up diagram of an example power supply component 1400 in an electronic candle in accordance with one or more embodiments of the present technology. The power supply component 1400 includes a solar panel 1421*a* that can be positioned on top of the compartment or base 1421. The power supply component 1400 includes a touch control device 1441 positioned along one side of the solar panel 1421*a*. The one or more controllers (e.g., the first controller, the second controller, etc.) can be circuitry on a printed circuit board (PCB) that is positioned within the compartment or base 1421. The battery 1422 can also be installed within the compartment or base 1421. The compartment or base 1421 also includes an electrical connection interface 1413, which can be covered by a waterproof cover 1423 to protect water or dust from damaging the electrical connection interface 1413.

In one example aspect, an electronic candle includes a mounting frame that includes a first connector and a power supply assembly that is detachable from the mounting frame. The power supply assembly includes a second connector that is configured to be coupled to the first connector upon attachment of the power supply assembly to the mounting frame and to be decoupled from the first connector upon detachment of the power supply assembly from the mounting frame. The first connector and the second connector enable the attachment and the detachment of the power supply assembly without moving or tilting the electronic candle. The power supply assembly further includes an energy storage, a first power source configured to charge the energy storage, and an electrical connection interface configured to connect the power supply assembly to a second power source. The electronic candle also includes a light-emitting assembly that is removably coupled to the mounting frame configured to operate using power provided by the power supply assembly and one or more controllers configured to control an operation of the light-emitting assembly. The light-emitting assembly comprises a frame sheet that resembles a shape of a real flame and a light source arranged to emit light onto the flame sheet.

In some embodiments, the mounting frame comprises a base, a mounting top, and multiple pillars. One end of the multiple pillars is connected to the base and the other end of the multiple pillars is connected to the mounting top. In some embodiments, the mounting frame further comprises multiple surfaces that connect to the multiple pillars, forming a closed cavity for positioning the light-emitting assembly. In some embodiments, the multiple surfaces comprise a transparent or translucent material. In some embodiments, the power supply assembly is configured to snap into place on top of the mounting frame to enable attachment and the detachment of the power supply assembly without movement of the electronic candle.

In some embodiments, the first connector comprises a slot and the second connector comprise a protrusion that is configured to snap into the slot in a snap-fit manner.

In some embodiments, the power supply assembly comprises a mounting hole configured to hold one or more additional light sources. The one or more additional light sources are configured to emit light to be blended with light from the light source of the light-emitting assembly. In some embodiments, the light-emitting assembly comprises one or more additional light sources positioned at a bottom surface of the light-emitting assembly. The one or more additional light sources are configured to emit light of different colors that vary over time. In some embodiments, the one or more additional light sources are positioned on top of a color adjustment ring that comprises multiple colors to emit light of different colors.

In some embodiments, the electronic candle further includes a touch sensor positioned on a top surface of the power supply assembly configured to detect a touch operation by a user, and a touch circuit configured to control a mode of operation of the electronic candle based on the detected touch operation. The mode of operation includes turning on the electronic candle, turning off the electronic candle, or setting a timer for the electronic candle.

In some embodiments, the energy storage comprises a battery. In some embodiments, the first power source comprises a solar power panel, a wind power panel, or a heat power panel. In some embodiments, the electrical connection interface comprises a Universal Serial Bus (USB) Type-C interface, a Lightning interface, a USB2.0 interface, or a USB3.0 interface. In some embodiments, the second power source comprises a Direct Current (DC) power source.

In some embodiments, the electronic candle further includes a protective cover positioned to cover the electrical connection interface. In some embodiments, the one or more controllers form a part of a printed circuit board positioned within the power supply assembly.

In some embodiments, the electronic candle further includes an infrared receiver configured to receive an infrared signal that enables a remote control of the electronic candle.

In some embodiments, the electronic candle further includes a voltage stabilizing device configured to stabilize output voltage from the first power source or the second power source during the operation of the electronic candle, and a voltage detection device configured to detect the output voltage during the operation of the electronic candle to enable a shutdown of the electronic candle in case the output voltage falls below a threshold.

In some embodiments, the electronic candle further includes a light detection device configured to detect an intensity of an ambient light. The one or more controllers are configured to turn on or off the electronic candle based on the detected intensity of the ambient light Some of the components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Some of the embodiments related to operations such as processing of signals or performing certain tasks and processes, described herein are described in the general context of methods or processes, which may be implemented at least in-part by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The foregoing is merely illustrative of the preferred embodiments of the present disclosure and is not intended to limit the present disclosure. Various changes and modifications may be made by those skilled in the art. Any modifications, equivalent alternatives are improvements that are made without departing from the spirit and principles of the present disclosure are to be encompassed by the scope of the present disclosure.

What is claimed is:

1. A lighting device, comprising:

a mounting frame that comprises:

a base, a mounting top, and multiple pillars, wherein a first end of the multiple pillars is connected to the base and a second end of the multiple pillars is connected to the mounting top;

a power supply assembly that comprises:

a rechargeable battery, and a solar panel coupled to the mounting top, wherein the solar panel is configured to charge the rechargeable battery when solar energy is available, wherein the power supply assembly is coupled to and decoupled from the mounting frame using a connector without moving or titling the mounting frame;

a candle-shaped light-emitting assembly removably coupled to the mounting frame independent of the power supply assembly, wherein the candle-shaped light-emitting assembly is positioned within a cavity formed by the multiple pillars of the mounting frame, wherein the candle-shaped light-emitting assembly comprises at least one Light-Emitting Diode (LED) and is configured to operate using power provided by the power supply assembly; and one or more controllers configured to control a mode of operation of the candle-shaped light-emitting assembly.

2. The lighting device of claim 1, wherein the mounting frame further comprises:

multiple surfaces, each configured to connect two adjacent pillars of the multiple pillars, wherein the multiple surfaces comprise a transparent or translucent material.

3. The lighting device of claim 1, wherein at least the power supply assembly is water resistant.

4. The lighting device of claim 1, wherein the mode of operation comprises at least setting a timer for the lighting device.

5. The lighting device of claim 1, wherein the candle-shaped light-emitting assembly comprises a frame sheet that resembles a shape of a real flame.

6. The lighting device of claim 1, further comprising a sensor, wherein the one or more controllers are configured to change the mode of operation of the candle-shaped light-emitting assembly based on a signal from the sensor.

7. The lighting device of claim 1, wherein the solar panel is positioned on top of the mounting frame.

8. The lighting device of claim 1, wherein the power supply assembly comprises an electrical connection interface configured to connect the power supply assembly to a second power source, wherein the electrical connection interface comprising a Universal Serial Bus (USB) Type-C interface, a Lightning interface, a USB2.0 interface, or a USB3.0 interface.

9. The lighting device of claim 1, wherein the power supply assembly includes an aperture that is configured to be coupled to the connector of the mounting frame upon attachment of the power supply assembly to the mounting frame and to be decoupled from the connector upon detachment of the power supply assembly from the mounting frame.

10. The lighting device of claim 1, comprising:

a touch switch configured to turn on or off the lighting device.

11. The lighting device of claim 1, wherein the one or more controllers are configured to turn off the candle-shaped light-emitting assembly after a predetermined amount of time.

12. The lighting device of claim 1, wherein a color of the at least one LED is close to a color of fire.

13. The lighting device of claim 1, further comprising:

a light detection device configured to detect an intensity of an ambient light, wherein the one or more controllers are configured to turn on or off the lighting device based on the detected intensity of the ambient light.

14. The lighting device of claim 1, further comprising:

an infrared receiver configured to receive an infrared signal that enables a remote control of the lighting device.

* * * * *